US012748344B2

(12) United States Patent
Jensen

(10) Patent No.: US 12,748,344 B2
(45) Date of Patent: Sep. 29, 2026

(54) PHOTOGRAPHY FLOAT

(71) Applicant: Robert John Jensen, Renton, WA (US)

(72) Inventor: Robert John Jensen, Renton, WA (US)

( * ) Notice: Subject to any disclaimer, the term of this patent is extended or adjusted under 35 U.S.C. 154(b) by 146 days.

(21) Appl. No.: 18/798,520

(22) Filed: Aug. 8, 2024

(65) Prior Publication Data

US 2026/0044057 A1 Feb. 12, 2026

(51) Int. Cl.

*G03B 17/56* (2021.01)
*B63B 7/08* (2020.01)
*B63B 17/02* (2006.01)
*F16M 11/12* (2006.01)

(52) U.S. Cl.

CPC ............ *G03B 17/561* (2013.01); *B63B 7/082* (2013.01); *B63B 7/085* (2013.01); *B63B 17/02* (2013.01); *F16M 11/123* (2013.01)

(58) Field of Classification Search

CPC ....... G03B 17/561; B63B 7/082; B63B 7/085; B63B 17/02; F16M 11/123
USPC .......................................................... 396/419
See application file for complete search history.

(56) References Cited

U.S. PATENT DOCUMENTS 6,623,322 B1 * 9/2003 Lesniak .................. B63B 7/085 114/361
2024/0253741 A1 * 8/2024 Varga ...................... B63B 7/087

OTHER PUBLICATIONS

"Floating Hide Camouflage Hideout—New perspectives on par with nature.," Floating Hide Website, Available Online at https://www.floating-hide.com/, Available as Early as Dec. 19, 2014, 14 pages.
Jensen, R., "Floating Hide," SmugMug Website, Available Online at https://robertjohnjensen.smugmug.com/Floating-Hide, Available as Early as Jun. 4, 2024, 2 pages.

* cited by examiner

*Primary Examiner* — Joel W Fosselman
(74) *Attorney, Agent, or Firm* — McCoy Russell LLP

(57) ABSTRACT

A photography float is described. The float may include an inflatable, planar, drop-stitch base shaped with a fore section, a first aft leg, and a second aft leg, a detachable a canopy arranged on a top surface of the inflatable, planar, drop-stitch base, and a camera mounting plate configured to be attached to the inflatable, planar, drop-stitch base and a gimbal to secure a camera.

19 Claims, 10 Drawing Sheets

PHOTOGRAPHY FLOAT

TECHNICAL FIELD

The present description relates to a flotation device for a photographer to operate a camera.

BACKGROUND AND SUMMARY

Wildlife photography is not only an art to be appreciated by all, but it is also utilized for many businesses in a variety of ways. The goal of most photographers is to be able to remain undetected from the subject that they are interested in capturing. In order to achieve this goal, photographers often rely on the use of a photography canopy. The canopy conceals the photographer and therefore provides advantages that allow for photographs of subjects in their natural habitat, without causing fear by the photographer's presence. While on land, the photographer is able to utilize a camera mounting system with a canopy overhead to conceal them from the subjects that they are interested in. In order to get stunning photographs of wildlife found in the water, a photographer may rely on a float to secure and rest their camera on while they are in the water.

A photography canopy is often called a photography-hide or simply photo-hide, which is an apparatus that is used to conceal the photographer from the subjects being photographed. Photography floats are photo-hides that are specifically designed to be used while in the water. There are currently different design-types that are available on the market, such as a hard plastic material or a pontoon-like assembly, with a camera mounting system. Limitations include, but are not limited to, uncomfortable and constricted positioning of the photographer, higher (vertically) than optimal positioning of the camera above the waterline, difficulty maneuvering in the water, heavy and cumbersome transport, and difficulty in assembly and disassembly. Furthermore, a limiting feature available designs is that the photographer is limited to staying close to the shore where their feet can touch the bottom of the water, greatly limiting the species of wildlife that the photographer can capture.

The inventor herein has recognized the issues noted above and that they may be addressed by a photography float that utilizes a drop-stitch platform, with two different canopy designs for concealment, containing a camera mounting system that is conducive for multiple different types of lens options. The camera mounting system has convenient traveling features that can be used for both water and land, but particularly suited for photographers looking to capture subjects while free floating in the water.

In an example, the above issues may be at least partially addressed via a photography float including an inflatable, planar, drop-stitch base shaped with a fore section, a first aft leg, and a second aft leg, a detachable a canopy arranged on a top surface of the inflatable, planar, drop-stitch base, and a camera mounting plate configured to be attached to the inflatable, planar, drop-stitch base and a gimbal to secure a camera. The approaches described herein enable photographs to be taken low to the water, which can improve capturing the subjects with improved background positioning, making the photographs more compelling. In one example, the photography float has a detachable canopy that involves a tension-rod-style of rods for support. An arrangement of attachment points, such as D-rings, grommets, and/or other attachment configurations provide for ease in attachment and detachment, which enables ease in folding when deflated for traveling purposes. Skids positioned at specific locations on the underside to provide control from overcorrecting when steering the float while free-floating in the water and/or stability while panning the camera. In this way, the float examples described herein may be used in the water, with the operator free from contacting the bottom of the body of water, and thus able to capture images in deeper water while still keeping the camera vertically close to the waterline.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present application relates to a floating image hide that may be used to provide a concealed space for a photographer in the water. The floating image hide may be used in nature to conceal the photographer from subjects to prevent them from getting spooked and leaving the area. The floating image hide may have various features to improve its portability to enable ease in transport by a single user without additional transport equipment. The floating image hide may also be structured so that it is easily assembled and disassembled quickly so that the photographer can spend more time capturing images and less time preparing.

The floating hide may provide a mounting mechanism for relatively heavy camera equipment. Specific to the floating hide, the float provides enough buoyancy to support the weight of the camera and at times, a portion of the weight of the photographer. Additionally, the float may provide a canopy to conceal the photographer and as much of the camera equipment as possible, with one or more selected openings for the camera lens and viewing windows to aid in the location and detection of subjects of interest.

Another feature of the floating hide described herein is that the camera mount has a low profile, relative to the surface of the water, to allow the camera lens to be close to the water while still keeping the float maneuverable and stable, in both shallow and deep water. Additionally, the floating hide provides improved comfort for long periods of time in the water by enabling the operation of the float without the user's feet touching the bottom of the body of water.

Figure 1:
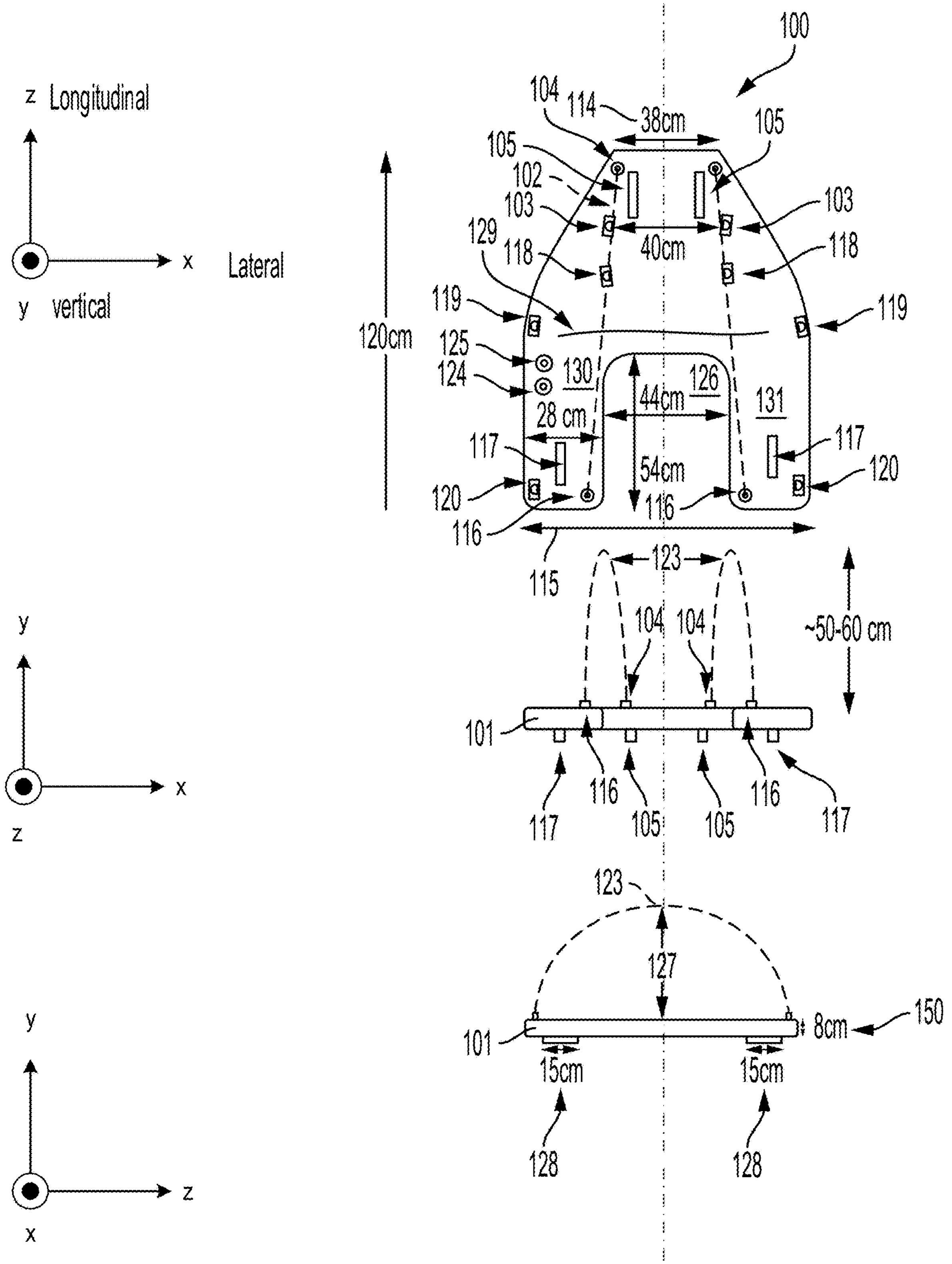
FIG. 1 shows the assembly of a tensioned-rod-design canopy photography float.
Figure 2:
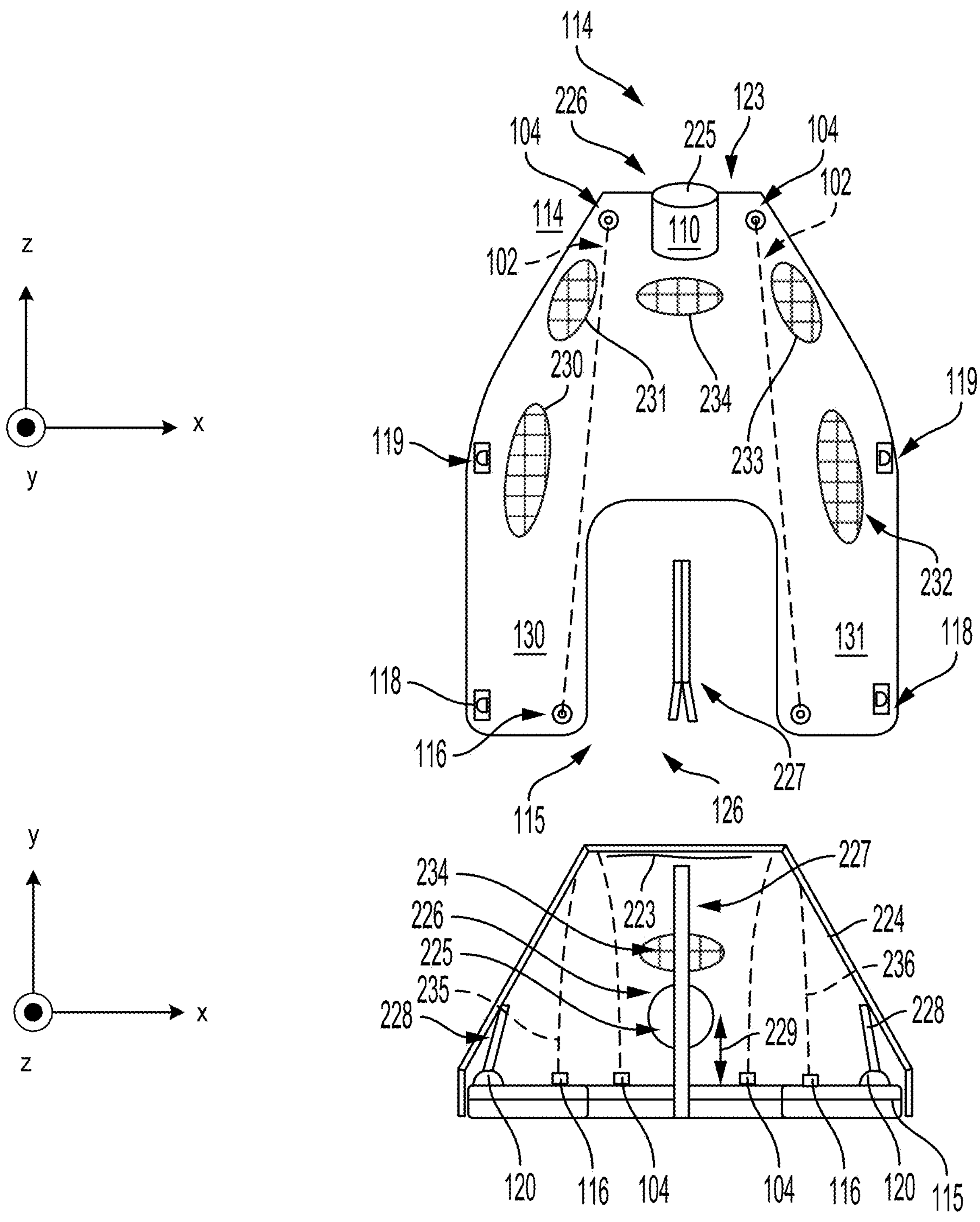
FIG. 2 shows the assembly of a tension-rod-design canopy photography float with the canopy attached.
Figure 3:
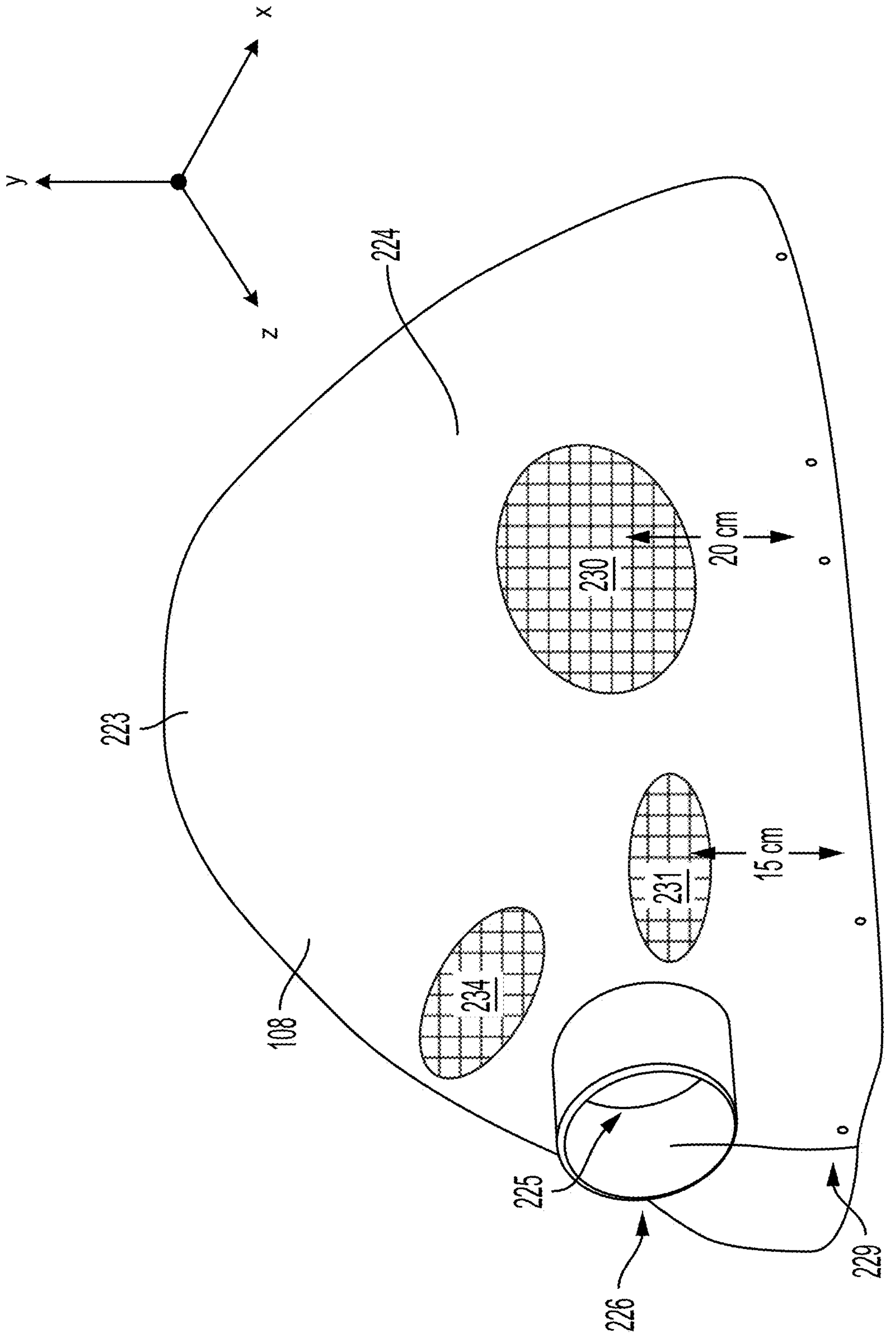
FIG. 3 shows an external view of the float with the canopy attached.
Figure 4:
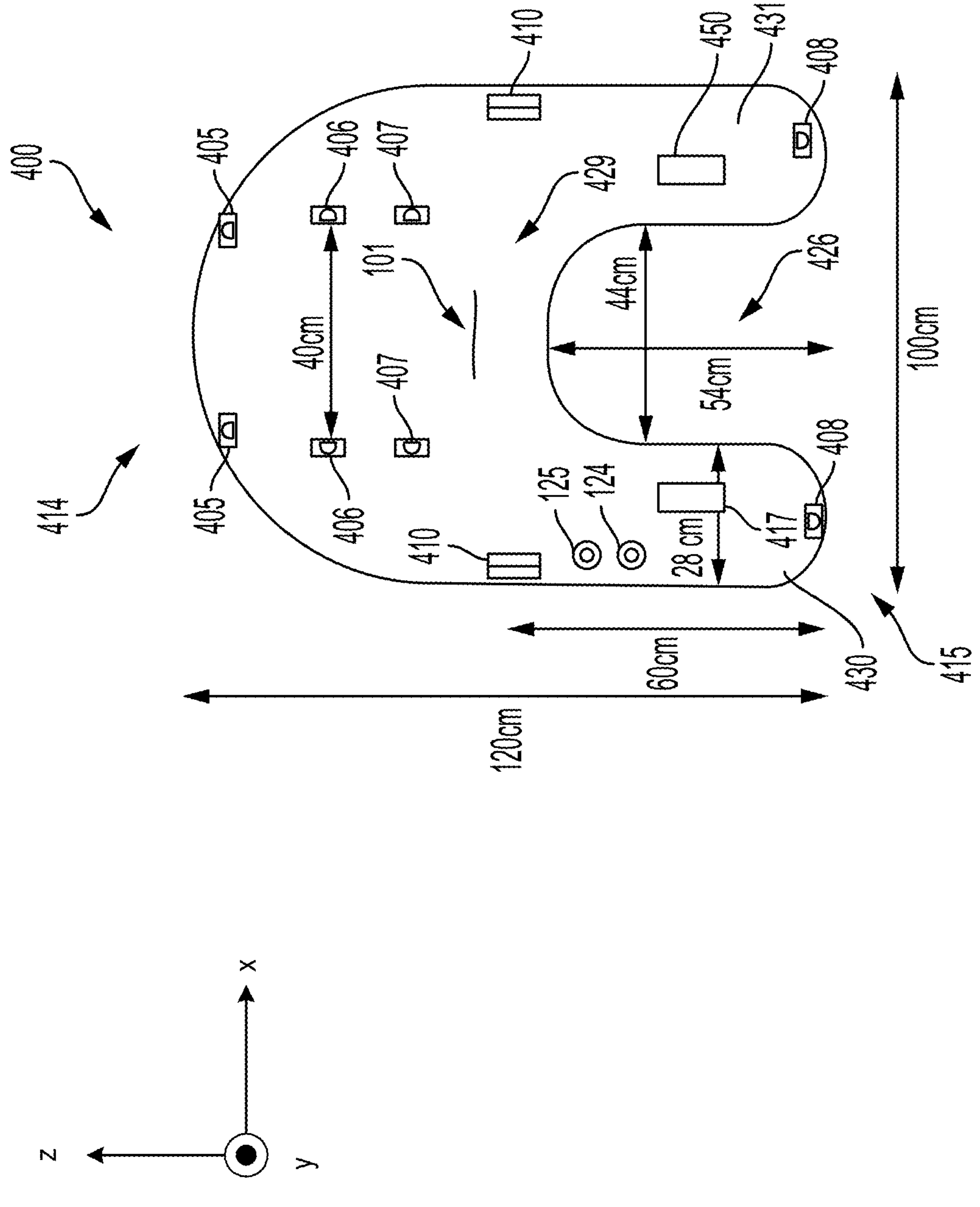
FIG. 4 shows the assembly of an accordion-design canopy photography float.
Figure 5:
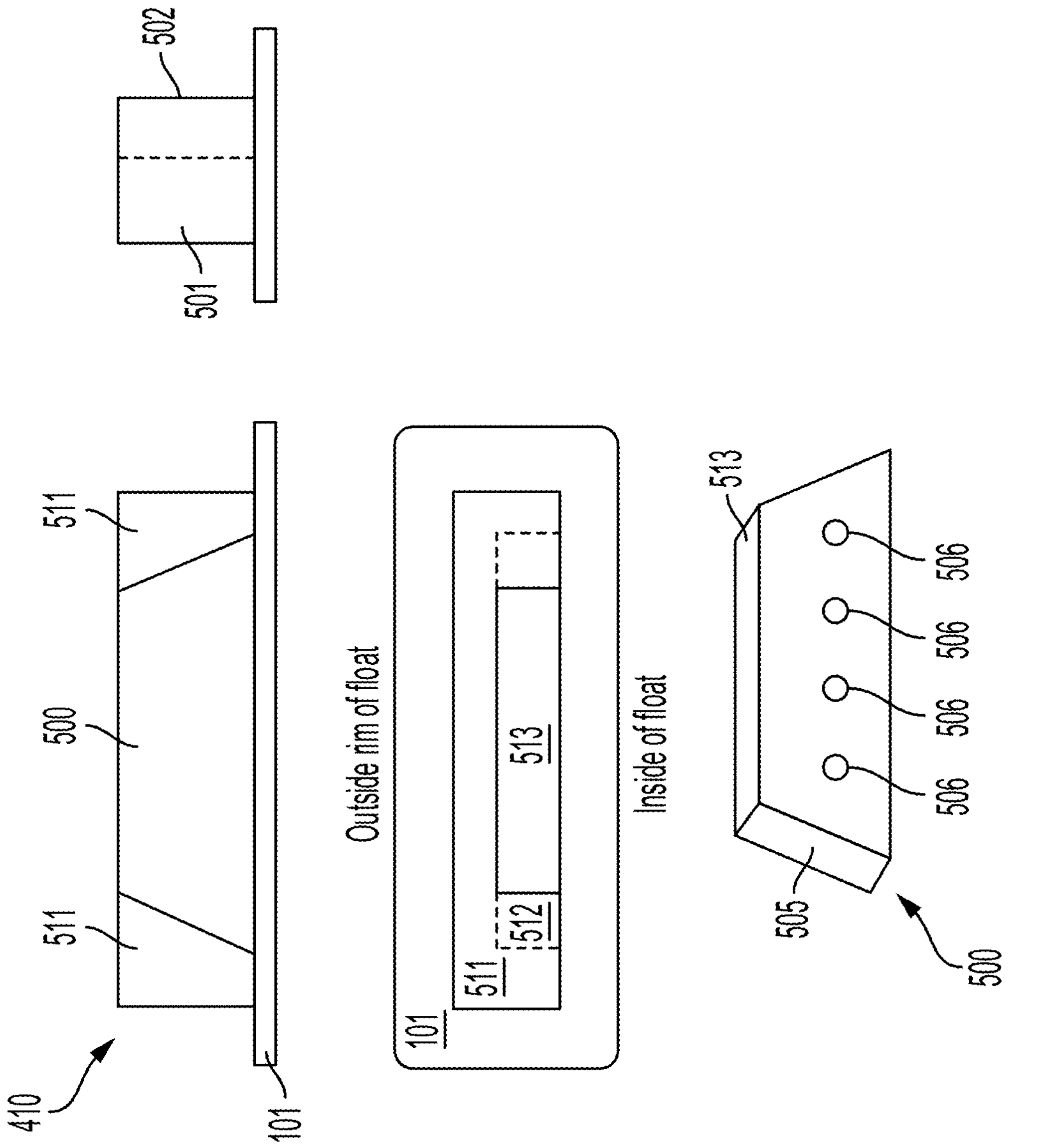
FIG. 5 shows the attachment block for the fiberglass rods.
Figure 6:
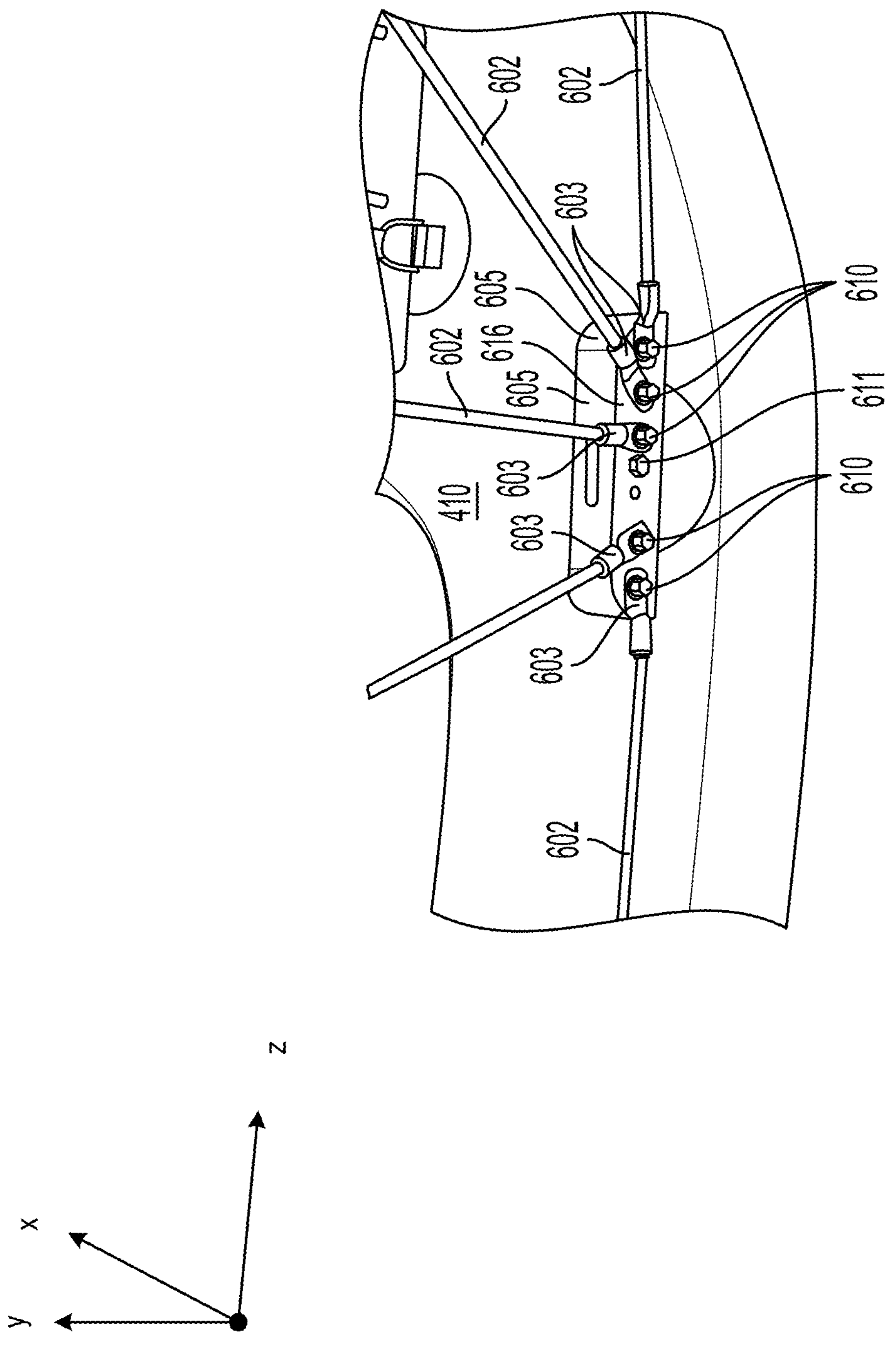
FIG. 6 shows the attachment block with attached rods.
Figure 7:
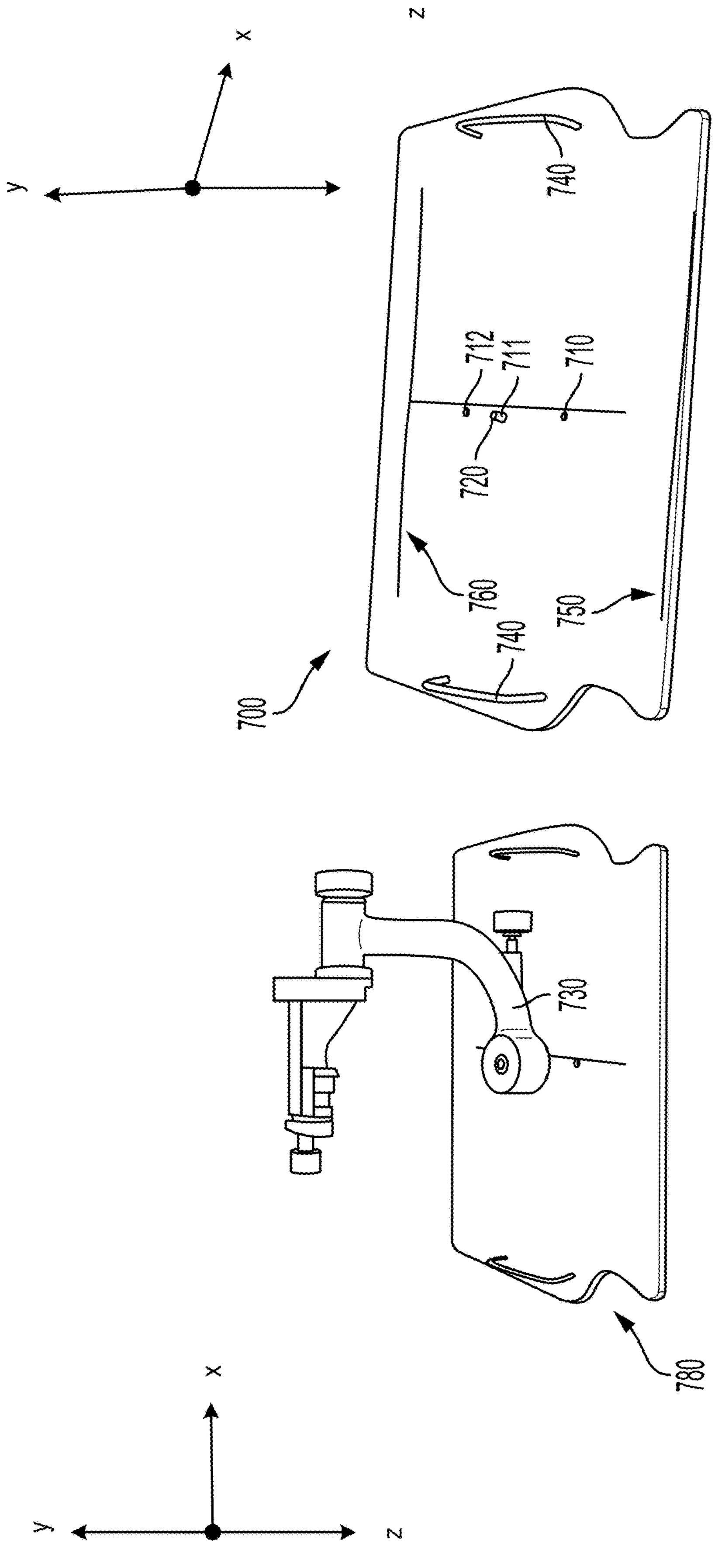
FIG. 7 shows the camera mounting plate.
Figure 8:
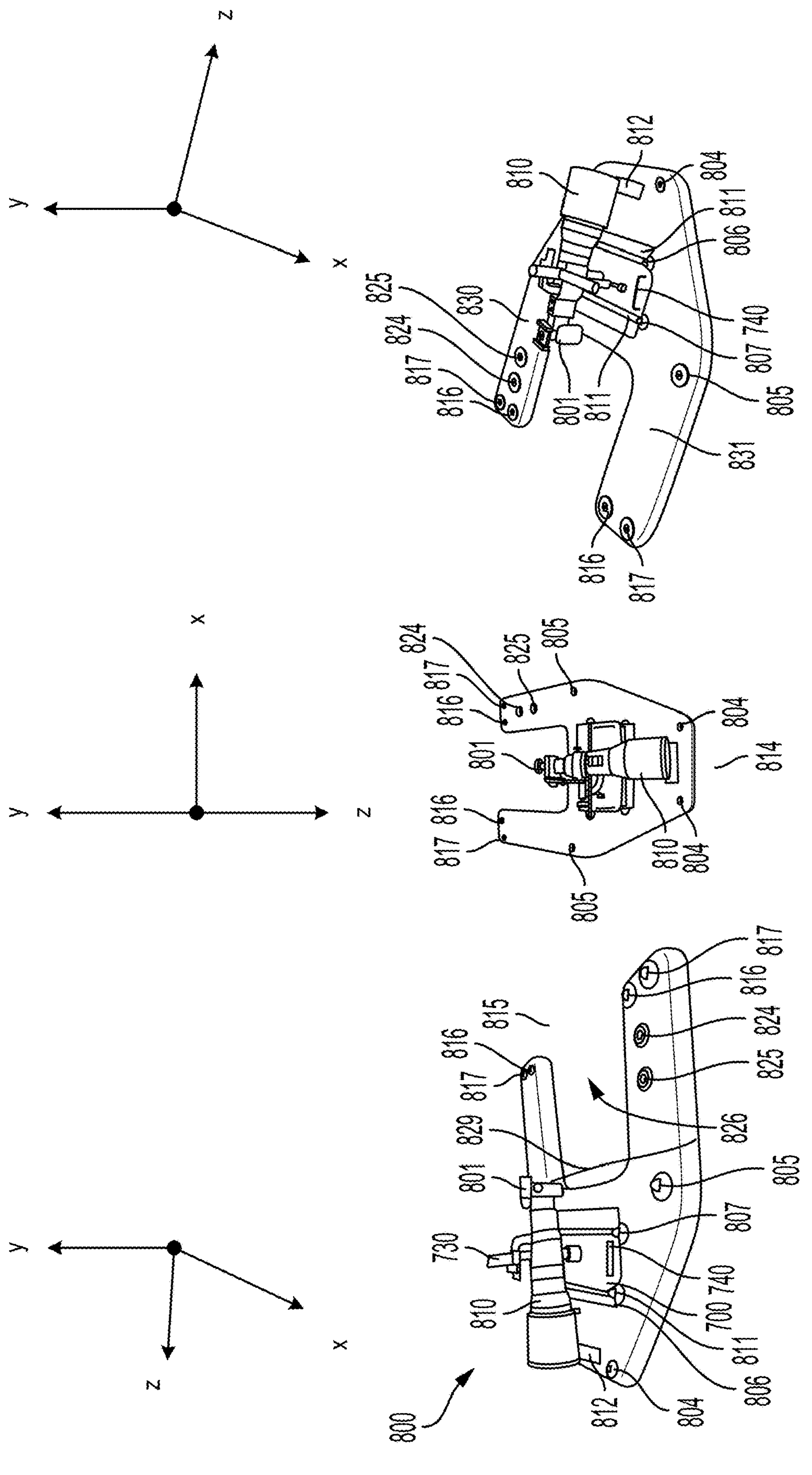
FIG. 8 shows the camera equipment attached to the mounting plate for a tensioned-rod-design canopy embodiment.
Figure 9:
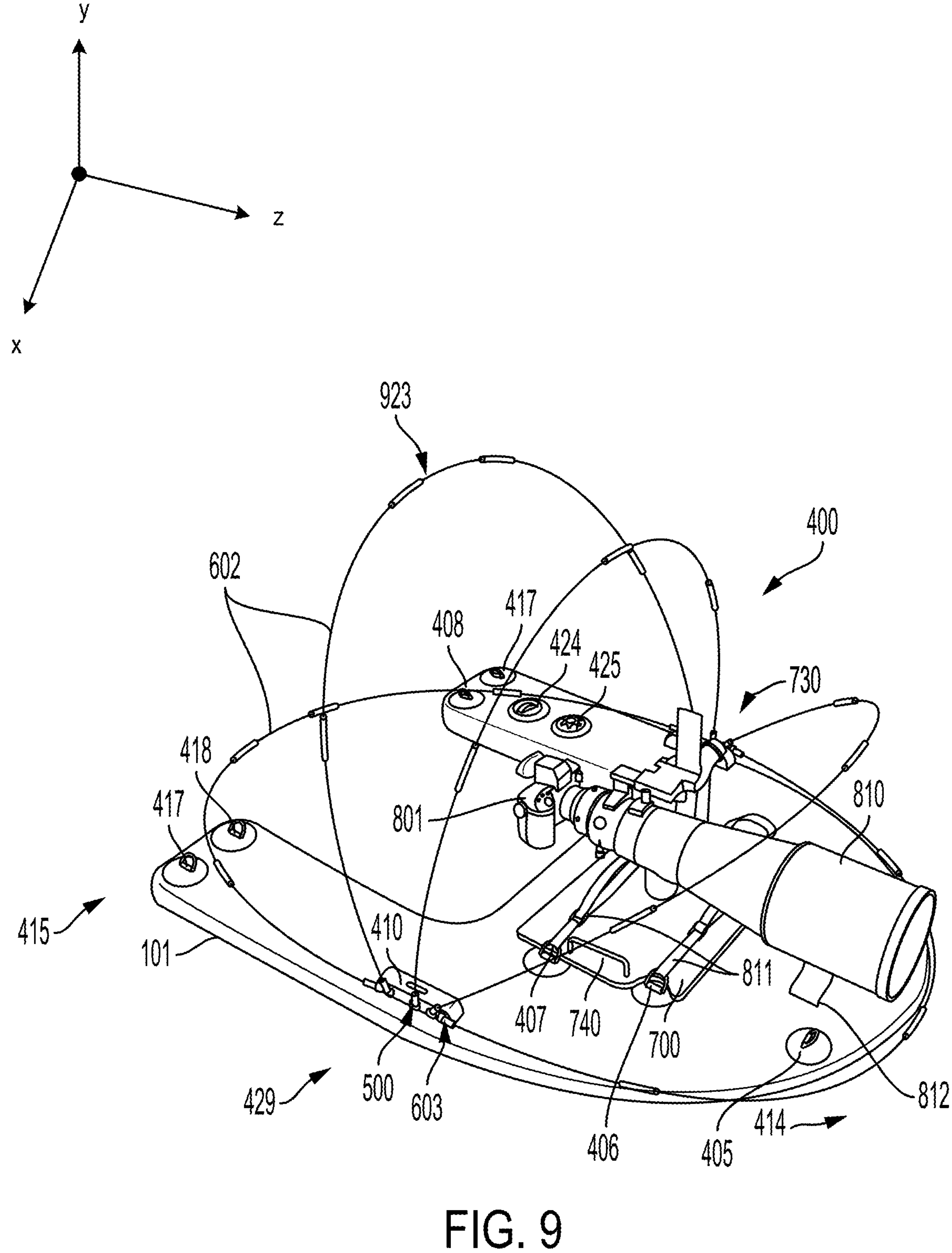
FIG. 9 shows the camera equipment attached to the mounting plate for the accordion-design canopy embodiment.
Figure 10:
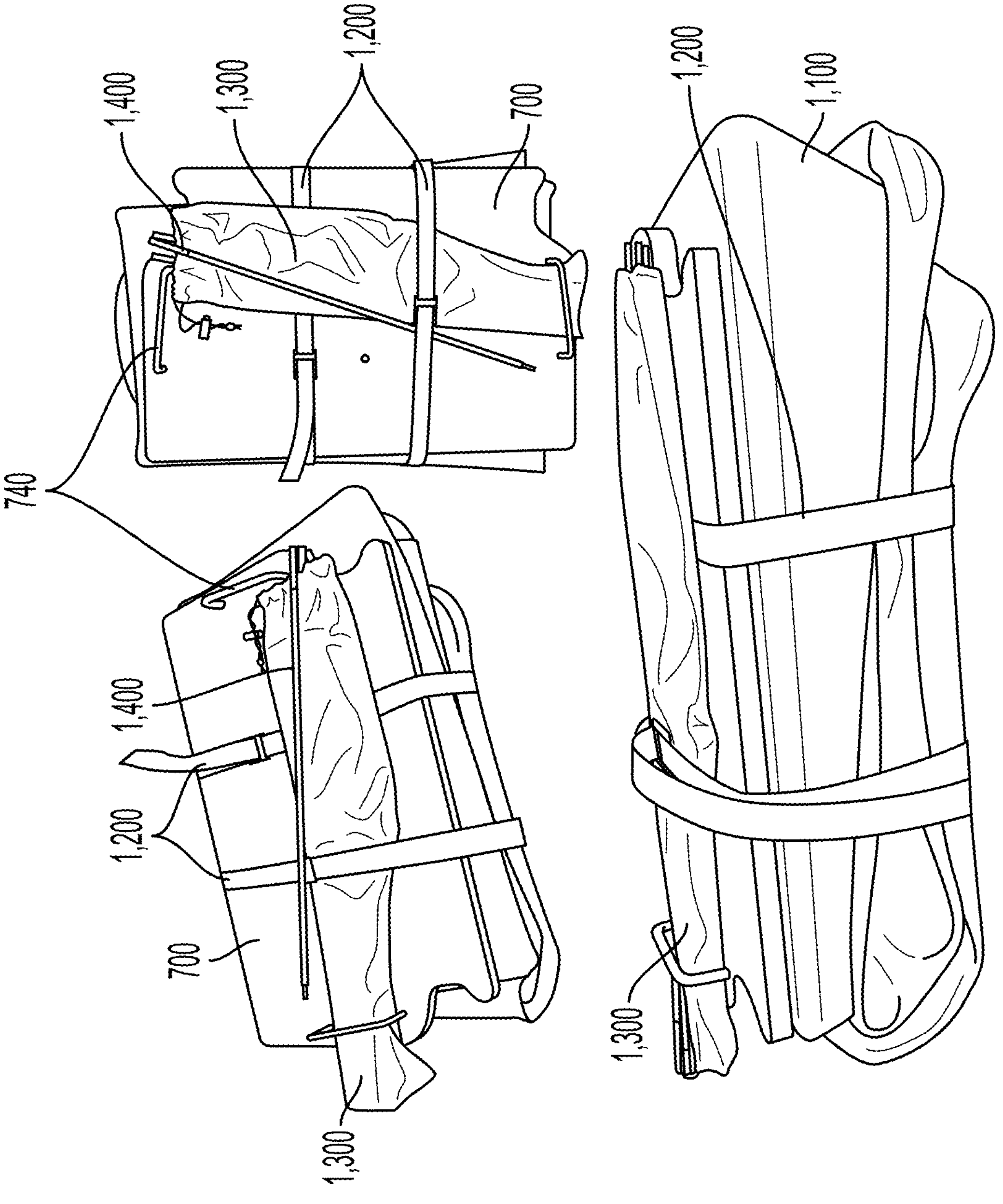
FIG. 10 illustrates the float when it is folded-up for traveling or storage purposes.

Thus, embodiments are disclosed herein that solve at least some of the issues described above and provide the features indicated above with a photography float with an inflatable base, made of drop-stitch material. A canopy may be arranged on the top-surface of the inflatable base and may cover substantially (e.g., at least 95%) of the inflatable base. A camera mounting plate may be included that is configured to attach a gimbal that is used to secure the camera and lens. Further, the inflatable base may include one or more valves, and one or more skids, and/or a mount for a removable fin, such as a battery powered fin. FIG. 1 shows a view of the photography float with a tension-rod-canopy. FIG. 2 shows a view of the photography float with a detachable canopy attached. FIG. 3 shows an external view of the photography float with the canopy attached. FIG. 4 illustrates the photography float with an accordion-canopy design. FIG. 5 shows how the canopy mounting block of FIG. 4 is attached to the fiberglass rods of the float. FIG. 6 also illustrates the canopy mounting block of the accordion-canopy design, but also containing the attached rods. FIG. 7 shows multiple images of the camera mounting plate 700, which may be used to secure the camera equipment to the inflatable body. FIG. 8 shows an image of the photography float 800 with a tensioned-rod-canopy design and securely attached camera equipment. FIG. 9 shows an image of the photography float with the accordion-canopy and securely attached camera equipment. FIG. 10 shows an image of the floats when folded-up for traveling and/or storage purposes.

FIGS. 1-4 and 6-9 include a coordinate system to orient the views. The y-axis may be a vertical axis (e.g., parallel to a gravitational axis when the float is positioned on the water), the x-axis may be a lateral axis (left to right), and/or the z-axis may be a longitudinal axis (e.g., horizontal axis). In the longitudinal direction, positive is in the fore direction, and negative is in the aft direction.

As used herein, "inflated" may indicate the referenced component is in an inflated state, wherein the component's shape is resistant to bending, folding, rolling, and the like. As used herein, "deflated" may indicate the referenced component is easily bent, folded, rolled, and the like, and has an internal pressure approximately equivalent to atmospheric pressure (e.g., 1 atm). A component may also be partially inflated, which may include states between deflated and inflated.

As described herein, the body of the float may comprise drop-stitch material. The drop-stitch material may include two woven fabric pieces with yarns that extend between the pieces of fabric. Drop-stitch fabric is able to be coated with a polymer such as neoprene, thermoplastic polyurethane (TPU), polyvinyl chloride (PVC), etc. to create an airtight enclosure. The fabric structure can then be inflated and maintain a planar shape as opposed to cylindrical or spherical shapes which are typical in other types of inflatable structures. The planar shape is achieved through the use of the drop yarn in the fabric. Lastly, thermoplastic coatings such as TPU and PVC can be heat welded to enclose and coat the drop-stitch fabric.

The drop-stitch fabric assembly includes a side wall, an upper piece and a lower piece. Further, drop yarn couples the upper piece and lower piece. In an example, the drop-stitch material of the floats 100, 400, 800 may be approximately (e.g., within 5% of) 8 cm thick 150, although other thicknesses may be used if desired.

Turning to FIG. 1, it shows a first example of a photography float 100, which includes a detachable tensioned-rod-canopy design. A tensioned-rod-canopy design float 100 may include an inflatable base made of drop-stitch material 101, a plurality of grommets 104, 116, used to secure the rods 102 (which may be fiberglass or aluminum, for example), a plurality of D-rings 103, 118, 119, 120, used to secure the camera mounting plate 700, and camera equipment 730, 801, 810, a canopy 224, canopy tie-down points 118, 119, and skids 105, 117. The skids are positioned on the bottom surface of the base and for guidance and stability while in the water.

In an example, the photography float may contain rods 102 that when assembled form an assembly 236 that resembles a tent-like structure. For example, a tensioned-rod-canopy design includes the rods 102 forming two overhead hoops when they are connected to both the front grommets 104 and the back grommets 116. When the rods 102 are connected to the two sets of grommets 104,116, this creates natural tension that provides support for the weight of the canopy (see FIG. 2, discussed below). The rod assembly 236 involves a single middle pole with an additional pole from the rear corner to the same side front corner, forming a tensioned-rod pattern that does not cross. The natural tension created by the tensioned-rod pattern of the rods 102 hold the rods 102 in place. Additional tension may be applied by straps connecting to the outside D-rings, which pulls the poles apart yet with the fabric keeping them tight. This provides easier access through the zipper and improved viewing window areas. The rod assembly 236 creates a stable structure that can support the weight of the canopy. The fiberglass rods can be quickly disassembled and reassembled when necessary. In an example, a first rod and a second rod are provided to be positioned in a first grommet and second grommet, and third grommet and fourth grommet, respectively.

In an example, receiving elements may be positioned in place of or in addition to the grommets for receiving the poles. The receiving elements may be rubber nobs with a hole, for example analogous to a flag pole holder, mounted to the inflatable base.

In an example, the curvature of the rods 102 provides for an apex height 127 of 50-60 cm, although other sizing may be used as desired. The rods 102 extend outward in order to support the weight of the canopy material. It is the protrusion, and lip with recess, of the grommets 104, 116 that secure the rods 102.

Returning to FIG. 1, it shows the entire assembly of the float 100 with the adhesively attached D-rings 103, 118, 119, 120, grommets 104, 116, and skids 105, 117. The D-rings 103, 118, 119, 120, and grommets 104, 116, are all attached to the drop-stitch material 101 of the photography float by use of a vinyl glue that is placed on-top of the float 100. The most frontward two sets of the D-rings 103, 118, located near the front 114 of the float 100, which may also be referred to as a nose, are used to attach the camera mounting plate 700 (see FIG. 7, discussed below) for the attachment of the photography equipment 730, 801, 810 (shown in FIG. 7, FIG. 8 and FIG. 9). The attachment points for the camera mounting plate 700 are secured using the front two sets of D-rings 103, 118, which are located just rearward the grommets 104 in the frontward position and are spaced approximately 40 cm apart in the example, although other spacing is also possible. In an example, the nose is substantially flat as illustrated in FIG. 1.

The float 100 may be symmetric about a longitudinal central axis illustrated with a dash-dot pattern.

The back 115 of the float 100 (aft) contains a rounded-square opening 126 with two legs, which in the depicted example is approximately 54 cm in length and 44 cm wide, although other sizing may be used. The rounded-square opening 126 enables the photographer to operate the camera equipment, navigate the float 100, and/or rest their arms on the sides. In this way, the rounded-square opening 126 for the photographer creates two comfortable arm rest structures 130, 131, forming a U-shaped float. The arm rest structures 130, 131 are approximately 28 cm in width in the example, although other sizing may also be used. Likewise, the arm rest structures 130,131 of the float are 60 cm in length, which is the length between the back D-rings 120 to the middle D-rings 119 for the canopy 224 tie-down points, although other spacing may be used. The rounded-square opening 126 extends from the back 115 of the float 100 to about an equal position of the placement of the deflation valve 125, which is discussed in more detail below, on the left sided arm support area 130.

In this example, there are two valves an inflation valve 124 and a deflation valve 125 located on the left sided arm support structure 130, positioned slightly rearward of the middle 129 portion of photography float 100. In another example, a single valve may be used for inflation and deflation. The valves, the inflation valve 124 and the deflation valve 125, are located just rearward of the D-rings 119 found in the middle 129 portion of the float 100. The inflation valve 124 is used for the insertion of air to inflate the float for use in the water or on-land to provide for an even platform. Air can be let out of the float using the deflation valve 125, which includes a twist-top covering (see FIG. 8, discussed below). The float may be advantageously deflated for traveling or storages purposes.

The U-shaped float is the widest in the back 115 of the float 100 and in the middle portion 129 of the float 100. The width of the float then tapers from the back 115 of the float 100 toward the square shaped front 114 of the float. The D-rings located in the rearward position of the arm resting structures (left sided arm support area 130 and the right sided arm support area 131) are positioned more outward than the two sets of D-rings 103, 118 located in the front of the float, which are used to secure the hard-plastic plate for camera mounting. The entire float 100 is 120 cm in length, and the front 114 is 38 wide in the depicted example, although other sizing may be used.

Attached to the bottom of the float are skids 105, 117, which are fin-like protrusions that are attached to the bottom of the float 100. The skids 105, 117 help the photographer to have control over the movement while in the water and maintain position/direction while panning the camera due to their positioning on the float 100. The skids 105, 117 are adhered to the drop-stitch material 101 of the float 100. The adhering of the skids 105, 117 can be accomplished through the use of a vinyl glue product. Alternatively, the skids 105, 117 can be molded into the drop-stitch material 101 itself.

The tensioned-rod-canopy float shown in FIG. 1 contains two sets of skids 105, 117, which are directly aligned with each other in a row longitudinally. The front skids 105 are approximately 40 cm apart and the back skids 117 are approximately 72 cm apart in this example, although other spacing may be used. The front skids 105 are located in the front of the float, between the grommets 104 in the frontward position and the first set of D-rings 103 in the frontward position. The other set of skids 117, found in the back 115 of float 100, in the rearward center of the arm rest structures (left sided arm support area 130 and the right sided arm support area 131) between the back grommets 116 and the back D-rings 120. The skids are approximately 15 cm wide 128, although other sized skids may be used.

The middle set of D-rings 119, located rearward of the second set of front D-rings 118 and in front of the back skids 117, are used for canopy tie-down points. Additionally, another set of D-rings 120 are found in the back 115 of the float 100, which are also used for canopy tie-down points. An additional set of D-rings can be added to the float for the purpose of securing the folded position of the float 100 for traveling and/or storage purposes (folded position shown in FIG. 10), such as illustrated in FIG. 8.

As illustrated in FIG. 1, the base made of drop-stitch material 101 is generally planar, in that its top surface and bottom surface are both planar and parallel with one another. The fore section of the base is tapered to a nose while the aft section includes two legs extending longitudinally rearward. The base may be symmetric about the longitudinal centerline. This overall shape creates a region between the legs where the photographer can be positioned when in the water so as to be able to rest their arms on the legs with the camera mounted on the fore section level with the water. Further, by positioning skids both fore and aft, it is possible to provide a more stable base while panning in the water and reduce inadvertent rotation, while still also providing improved guidance with moving in the water to reposition the float. Each set of attachment points (for the two rods enabling the canopy to cover the base) are offset laterally from fore to aft, with each set offset symmetrically about the longitudinal centerline axis so as to be angled relative thereto. The symmetric offset angle enables the rods, when installed and in tension, two create tension on the canopy so as to reduce sagging and keep the canopy taut when installed, while still enabling the photographer to be able to enter and exit through an aft zipped opening in the canopy as described in more detail below.

FIG. 2 shows a view of the exemplary photography float of FIG. 1 with a tensioned-rod-canopy design float 100, but with the canopy 224 attached to the float. A tensioned-rod-canopy design float 100 may include a detachable canopy 224 to the float 100. In an example, the float 100 may contain rods 102 that form two hoop-like structures 235, 236 when the rods 102 are connected to two different sets of grommets 104, 116, which supports the weight of the canopy 224 by the natural tension provided by the rods 102.

The D-rings 103, 118, 119, 120, and grommets 104, 116 have the same arrangement as found in FIG. 1. When the rods 102 are attached to both the grommets 104 in the frontward position and the grommets 116 in the rearward position, they make a left half-hoop structure 235 and a right half-hoop structure of the rod assembly 236. The space between the left half-hoop structure 235 and the right half-hoop structure of the rod assembly 236 form the apex space of canopy 223.

When the canopy 224 is attached, the highest points of the canopy top, the apex of the canopy 223, have a square appearance due to the height between the apexes of the fiberglass rod curvature 123 when the rod assembly 235, 236 is folded into the half-loop position. The canopy gets wider in width as the canopy 224 meets the edge of the drop-stitch material 101 of the float 100. The canopy 224 is secured to the drop-stitch material 101 by the use adjustable tie-down straps 228.

In this example, there are five viewing windows 230, 231, 232, 233, and 234, of two different sizes, for the photographer to observe the surroundings. The larger-sized left side window 230 has an approximate width of 20 cm, although other sizes may be used. The window is to be used when viewing subjects of interest on the left side, respective of the camera lens. The larger, left window is approximately 30 cm away from the camera opening 225, in the example, although other sizing is also possible. The larger window size provides for more space to visualize wildlife that is farther away. The smaller-sized left side window 231, positioned closer to the camera lens opening 225, has an approximate width of 15 cm, in the example, although other sizing is also possible. The right window is to be used when viewing the subjects of interest on the right, respective of the camera lens, which is approximately 5-10 cm away from the camera opening 225, in the example, although other spacing is also possible. The smaller window size provides for visualizing wildlife on the left side that is closer to the float 100.

The larger-sized right side window 232 has an approximate width of 20 cm, in the example, although other sizing is also possible. The large right side window is to be used when viewing subjects of interest on the right side, respective of the camera lens. The larger, right window is approximately 30 cm away from the camera opening 225, in the example, although other spacing is also possible. The larger window size provides for more space to visualize wildlife on the right side, respective of the camera lens opening 225. The smaller-sized right side window 233, positioned closer to the camera lens opening 225, has an approximate width of 15 cm, in the example, although other sizing is also possible. The right side window is to be used when viewing the subjects of interest on the right, respective of the camera lens opening 225, which is approximately 5-10 cm away from the camera opening 225, in the example, although other spacing is also possible. The smaller window size provides for visualizing wildlife on the right side that is closer to the float 100.

The smaller-sized viewing windows 231, 233, those located closer to the camera opening 225, on the left and right sides of the canopy 224 are positioned rearward of the grommets. The larger-sized set of windows 230, 232, having a width of 20 cm, in the example, although other sizing is also possible. The larger-sized viewing windows are located on the left and right sides are positioned above the D-rings 119 that are found on the sides of the float.

The most frontward viewing window 234, located directly above the camera opening 225, has a width of approximately 15 cm, in the example, although other sizing is also possible. The front viewing window is to be used for when the subject of interest is directly in front of the camera lens.

The camera opening 225 contains an elastic band 226 that conceals the end of the camera. The elastic band 226 secures the canopy 224 around the shaft of the camera lens, without obstructing the camera lens. The camera opening 225 and elastic band 226 can be adjusted to fit a variety of different lens sizes.

As mentioned previously, having the camera lens opening 225 as close to the surface of the water as possible enables improved capturing of the subject of interest at the subject's level. The space 229 from the top surface of the float to the middle of the camera opening 225 is approximately 18 cm, although other spacing may be used.

The zipper 227 is positioned in the back of the canopy 224, which is aligned with the back 115 of the float 100. The zipper 227 may be positioned as an aft zipper and may be used to close the sides of the canopy 224 and conceal the photographer from the backside. The canopy 224 is made of a canvas or canvas-like material. Although the design on the canopy material is camouflage, it could be of another natural environment design or a single color.

FIG. 3 shows an external view of the float 100 with the canopy 224 attached providing concealment of the photographer. The canopy 224 may contain viewing windows 230-234 that are used to detect subjects of interest at varying distances away from the camera lens (camera equipment shown in FIG. 10).

The particular angle view of the canopy 224 in FIG. 3 only shows three visible viewing windows 230, 231, 234 because two of the viewing windows 232, 233 are on the other side of the canopy, not visible at the angle shown. The canopy 224 is made of one entire piece for fast assembly. Additionally, the viewing windows 230, 231, 232, 233, 234 have a camouflage tint to them, to hide the opening of the windows.

Turning to FIG. 4, another photography float is illustrated, which is referred to as an accordion-canopy design float 400. An accordion-canopy design float 400 may include an inflatable base made of drop-stitch material 101, a permanently attached canopy mounting block 410 that is used for the attachment of rods, D-rings used to secure the camera mounting plate (shown in FIG. 7) and camera equipment (shown in FIGS. 7-9), a canopy 224, canopy tie-down points connected to D-rings 405, 408, and skids 450. In an example, once the photography float is inflated, an accordion-style rods (shown in FIG. 6) can be un-coiled and folded over the float. The canopy 224 can then be snapped onto the rods, without any rod-assembly requirements.

An accordion-canopy design float 400 utilizes rods (shown in FIG. 6) instead of standard rods 102 as used for a tensioned-rod-canopy design float 100. The rods are permanently fixed to a canopy mounting block 410 that is attached to the drop-stitch material 101 of the float 400 (using a type of wood/wood-like material adhesive). In an example, the mounting block 410 may comprise high density plastic and/or combinations of wood, plastic, and/or other materials. The advantage of the permanently attached canopy mounting block 410, with associated rods, is to allow for decreased assembly when setting up the photography float.

When the rods are in an un-coiled position, they are used to support the canopy 224 by forming several overhead half-circle structures (hoops) when they are connected to the canopy mounting blocks 410. When the rods are un-coiled, the canopy can be pulled out of the bag and snapped onto the rods. Therefore, no assembly of the fiberglass rods are required, making assembly optimal for the photographer.

The rods in an accordion-canopy float can also be coiled to one side when the float is to be folded for traveling or storage (shown in FIG. 9). Folding of the rods requires that the rods are thin enough to coil. The round-shaped front 414 of the float 400 matches an accordion-canopy design formed by the rods.

The canopy mounting blocks 410 are aligned with each other, one on the left side and one on the right side. The canopy mounting blocks 410 are found centered with the middle portion 429 of an accordion-canopy design float 400, toward the outer edge of the outer drop-stitch material 101, in order to provide for the maximum amount of head-room under the canopy 224 (not shown). Similar to the first example, the curvature of the rods 602 provides for an apex height of 50-60 cm, in the example, although other spacing is also possible. The canopy mounting blocks 410 are rectangular in shape when viewed from the outside of the float (facing the water), with a separate inset piece 500, that is trapezoid-shaped, for the connection points of the rods (discussed more in FIG. 5 and FIG. 6).

It is advantageous for the canopy 224 to be detachable for the purpose of folding, traveling and storage. However, in an example, the rods may remain attached to the mounting blocks. The canopy mounting blocks 410 provide for a good form factor for the canopy design because the fiberglass rods do not go across the body or obstruct the arms when handling the camera equipment. Furthermore, in an accordion-canopy design float 400, the canopy 224 is secured using the canopy mounting blocks 410. Therefore the example shown in FIG. 4 doesn't involve the use of grommets, as utilized for a tensioned-rod-canopy design float 100, as shown in FIG. 1.

The front set of D-rings 405 and the last set of D-rings 408 are used for the attachment points of the camera mounting plate 700, which is discussed in greater detail in FIG. 7. The four sets of D-rings that, shown in FIG. 4, are attached to the drop-stitch material 101 in the same manner as described for the first example, which is using a type of vinyl glue. It should be noted that, in comparison to a tensioned-rod-canopy design float 100, an accordion-canopy design float 400 has the first set of D-rings 405 in the front of the float 400 in a horizontal position instead of the vertical position.

The other two sets of D-rings in the front of the float are in the vertical position, as found in a tensioned-rod-canopy design float 100. These two sets of D-rings, 406, 407 are used to secure the hard-plastic plate that is used to attach the camera mount and thus the camera equipment (shown in FIG. 8 and FIG. 9). The D-rings 406, 407, used to secure the camera mounting plate (see FIG. 7, discussed below), are aligned with each other in a similar manner found in the FIG. 1, which is approximately 40 cm from the left side D-rings to the right side D-rings, in the example, although other spacing is also possible. The first set of D-rings 405, when viewing the float from the rounded front-end 414 to the back end 415, are spaced slightly less than 40 cm (due to the horizontal positioning), although other spacing is also possible.

The very back end 415 of the float 400 also contains D-rings 408 in the horizontal position. Similar to the example found in FIG. 1, the rearward D-rings 408 are aligned with each other from the left arm support structure 430 to the right arm support structure 431. Given the U-shaped float, the rearward D-rings 408 are spaced a greater distance apart, which is approximately 7 cm apart, in the example, although other spacing is also possible. The arm support structure has a width of 28 cm, in the example, although other spacing is also possible. Therefore, the placement of the rearward D-rings is centered, 14 cm in the example, although other spacing is also possible. This position is at the very rearward position and on the edge position of the arm support structures 430, 431.

The back end 415 of the float 400 also contains a rounded-square opening 426, which is approximately 54 cm in length and 44 cm wide, although other spacing is also possible. The photographer uses the rounded-square opening 426 to operate the camera equipment (shown in FIG. 8-9) and also for navigation. Similar to a tensioned-rod-canopy design float 100, 800, an accordion-canopy design float 400 contains a rounded-square opening 426, creating two comfortable arm rest structures 430, 431 that form a U-shaped float. The arm rest structures 430,431 of the float are 60 cm in length, although other spacing is also possible. The arm rest structures 430, 431 have the same length as the distance between the rearward D-rings 408 to the canopy mounting blocks 410, located in the middle area of the float 429. The rounded-square opening 426 extends from the back end 415 to about an equal position of the placement of the deflation valve 425, discussed in more detail below, on the left sided arm support area 430.

In this example, there are two valves 424,425 located on the left sided arm support structure 430, positioned slightly rearward of the middle portion 429 of float 400. The valves, the inflation valve 424 and the deflation valve 425, are slightly left of skids 450, which have the same width as described in the first example (15 cm, although other spacing is also possible).

As shown in FIG. 4, the U-shaped accordion-style canopy float 400 is the widest in the back end 415 and in the middle portion 429. The width of the float then tapers from the back end 415 toward the rounded front-end 414 of the float 400. Again, the D-rings 408 located in the rearward position of the arm resting structures 430, 431 are positioned more outward than the three sets of D-rings located in the front of the float 405-407. The entire float 400 is 120 cm in length, and the rounded front-end 414 is 38 wide, in the example, although other sizing is also possible.

As shown in the first example, an accordion-canopy design float 400 also has skids 450 that are attached to the bottom of the float 400. The skids 450 are of the same structure as described previously (protrusions that are 15 cm wide, although other sizing is also possible) and adhered in the same way. A tensioned-rod-canopy design shown in FIG. 1, contains two sets of skids 105, 117, one set found in the front of the float and one set found in the back 115 of float 100. In comparison, an accordion-canopy design float 400 in FIG. 4, has only one set of skids 450 that are located back end position 415 of float 400 in the rear center of the arm rest structures 430, 431, positioned slightly to the right and frontward of the back D-rings 408. Further, the skids 450 are positioned slightly to the right and rearward of the inflation valve 124 and deflation 125 valves.

The most frontward set of D-rings 405 and the most rearward set of D-rings 408, are used for canopy 224 cover tie-down points. An additional purpose of the tie-down points are for securing the folded position of the float 400 for traveling and/or storage purposes (folded position shown in FIG. 10).

An illustration of the canopy mounting block 410 is shown in FIG. 5. The canopy mounting block 410 is used in the accordion-style canopy float 400, and is used to permanently attach the rods (shown in FIG. 6) that are used to support the canopy weight. The canopy mounting block 410 may include rods, an inset piece with holes 506 is used for attachment of said rods. Further, the front side of the inset piece, facing the outside of the float that receives the rods. There is also a back side that faces the internal space of the float 400. Additionally, the canopy mounting block 410 may contain a filler material 511, which is used to support the inset piece 500 of the canopy mounting block. In an example, the photography float 400 uses the canopy mounting block 410 to permanently secure the fiberglass rods in a manner that supports the canopy 224 while providing a comfortable amount of space for the photographer to rest their arms.

The bottom of the canopy mounting block 410 attaches to the drop-stitch material 101 of the float 100, 400, 800, in a manner discussed previously (using vinyl glue for example). The center inset piece 500 of the canopy mounting block 410 is trapezoid in shape and is secured using additional support material 515 to fill the tapered sides 505 of the canopy mounting block 410.

When looking only at the inset piece 500 without the additional support material 515 from the side that is found on the outside of the float 400, one can see four holes 506 that are equally spaced apart and centered in the middle surface area of the side facing the outside of the float 400. The rods are connected to the holes 506 by the use of screws (shown in FIG. 6).

When viewing the canopy mounting block 410 from a bird's-eye view, one can see the top surface area 513 of the inset piece 500, the additional support material 511 that secures the inset piece 500, which has a base (not shown) that connects to the drop-stitch material 101 of the float 400, and the outside and inside rim of the float 400 itself. When viewing the canopy mounting block 410 from the side, there is a back side 501 that is closest to the outside rim of the float 510 and a front side 502 that is closest to the inside rim 516 of the float. The holes 506 located in the inset piece 500 are facing the outside rim of the float 510.

As previously mentioned, an accordion-canopy design float 400 contains a specific type of fiberglass rod, different than the first exemplary embodiment (tensioned-rod-canopy design float 100). The fiberglass rods used for an accordion-canopy design float 400, are a type of rods 602 with bullnose tips 603 on each end. The bullnose tips 603 of each end of the rods 602 are used to connect the rods 602 with the separate inset piece 500.

FIG. 6 shows the canopy mounting block 410 with the rods 602 attached to the inset piece 500. The canopy mounting block 410 may include an inset piece 500 that contains holes 506 that are used to connect to the bullnose tips 603, of each rod 602, to the inset piece 500. The bullnose tips 603, of the rods 602, are connected to the inset piece 500 by the use of screws 610. In an example, the rods 602 may be coiled to one side of the float 400 due to the movability provided by the bullnose tips 603 at the end of each rod 602. Further, the rods 602 can be uncoiled just as easily before the photographer snaps on the canopy 224.

The connections between the holes 506 positioned on the outside-facing 615 (facing toward the water) surface area of the inset piece 500 of the canopy mounting blocks 410 are accomplished using relatively small-sized screws 610. The top face 606 of the canopy mounting block 410 is also visible in FIG. 6, along with the tapered side 605. The inside-facing (facing toward the center of the float 400) surface of the canopy mounting block 410 (see FIG. 5, discussed above). There is an additional screw 611 that is positioned in the center of the canopy mounting block 410.

The canopy 224 is permanently attached and can be coiled to one side when it is not in use and then extended to the other side when desired. When the canopy 224 is folded, the bullnose tips 603 of the rods 602 allow for movement that enables proper folding without disassembling canopy 224.

FIG. 7 shows on the right, the camera mounting plate 700 containing three different positions 710-712 from which to choose, regarding the placement of the gimbal 730. The gimbal 730 is used to attach the camera. FIG. 7 also shows, on the left, the plate with the gimbal 730 mounted in an example position. In an example, the photographer may start out using a short lens for a subject that is close to the camera lens, therefore the gimbal 730 would be attached to the most frontward attachment point 710, relative to the plate 750 and the rounded front-end 414 of the float 400.

In an example, the camera mounting plate 700 may include detents 780 on the lateral sides to enable strapping to the base. The detents may include a first side detent and a second side detent symmetrically positioned about a longitudinal axis of the plate. The detents may be shaped such that the aft side end of the plate is narrower than the fore side end of the plate, thus aligning with the D-rings in such a way that the mounting plate can only be mounted in one orientation, thus reducing potential mis-mounting.

The camera mounting plate 700, attached to the D-rings on the floats 100, 400, 800, is used to provide a stable removable mounting mechanism for the gimbal 730 or ball-head to which the camera and lens are attached. By having a removable camera mounting plate, it is therefore possible to obtain a more compact deflated condition for transport, where the plate serves to help compress and secure the deflated/folded base (as discussed and illustrated below). The camera mounting plate 700 may comprise plastic, so that the structure is rigid enough to support the gimbal 730, in addition to the camera equipment (shown in FIG. 8 and FIG. 9). The front position 750 of the camera mounting plate 700 is positioned frontward of the handles. The rearward position 760 of the camera mounting plate 700 is positioned rearward of the handles.

The gimbal 730 is in the attached position in the left image of FIG. 7. The gimbal 730 provides rotation along an axis, or axes, instead of fixed in a single position. The three axes that a gimbal 730 provides are called pitch, roll or yaw. The gimbal 730, operated by the photographer for nature photography, is used as a passive device that allows for effortless camera movement, such as vertical and horizontal movement. The gimbal supports the camera and lens at its center of gravity to enable the camera to be pointed at a subject, holding the desired position in place. (shown in FIGS. 8-9). Further, other mounting mechanisms, such as a ball head mount, may be used to mount the camera directly to the float mounting plate in other examples.

Lenses of different sizes can be used on the camera mounting plate 700. The camera mounting plate 700 contains three different positions 710, 711, 712 for the gimbal attachment piece 720. In the image on the right side of FIG. 7, the gimbal attachment piece 720 is located in the center position. However, the other two positions can also be used depending on the type of camera lens (shown in FIGS. 8-9) that the photographer is using. However, there may be more or fewer mounting holes utilized in the mounting plate in other examples.

The camera is attached to the gimbal 730, which is attached to the gimbal attachment piece 720. The super telephoto lens is among the largest options for a camera lens, therefore the gimbal attachment piece 720 would be positioned in the most rearward opening 712, found on the camera mounting plate 700.

If the photographer wishes to capture a subject of interest that is a moderate distance away from the camera, the photographer would attach a medium telephoto camera lens (not shown) to the camera. The camera is attached to the gimbal 730, which is attached to the gimbal attachment piece 720. The medium telephoto lens is of a modest size for a camera lens, therefore the gimbal attachment piece 720 would be positioned in the middle opening 711 found on the camera mounting plate 700 (as shown in FIG. 7).

If the photographer wishes to capture a subject of interest that is a close distance from the camera, the photographer would attach a short telephoto camera lens (not shown) to the camera. The camera is attached to the gimbal 730, which is attached to the gimbal attachment piece 720. The short telephoto lens is of a smaller size for a camera lens, therefore the gimbal attachment piece 720 would be positioned in the most frontward opening 710 found on the camera mounting plate 700 (as shown in FIG. 7).

In other examples however, the camera mounting plate 700 could be potentially 3D printed and, by the use of adhesives, attached directly to the float itself. If the mounting plate were to be directly attached to the float itself, the system would be no longer have the D-ring attachment points, potentially saving cost on manufacturing.

FIG. 8 shows further details using an approach similar to that of FIG. 1, with a placement of the camera 801 and the camera lens 810. The float 800 may contain a camera mounting plate 700 and camera equipment 801, 810, with the associated D-rings 806, 807 used secure the plate 700, in addition to the D-rings 804, 816 used to hold the fiberglass rods 802 in place to support the canopy 224, with an optional D-ring set 817 for the cover tie-down points, and with skids (not shown). In an example, the photographer includes the optional D-ring set to enable a more securely compact folded position of the float for traveling.

The third example utilizes a tensioned-rod-canopy design, which is detachable, as described in the first example shown in FIG. 1. However, in this example, there are some variations illustrated relative to FIG. 1. The entire assembly of the float 800 with the D-rings 804, 805, 806, 816, 817 adhesively attached to the drop-stitch material 101 is shown in FIG. 8. The D-rings of the photography float 800 are attached in the same manner as described earlier (using vinyl glue).

The most frontward set of D-rings 804 are used to secure the rods 102 to the rearward D-rings 816 found at the back-end of the float 815. The front two sets of D-rings 806, 807 are used to attach the camera mounting plate 700 for the attachment of the photography equipment 801, 810. The attachment points for the camera mounting plate 700 utilize the front two sets of D-rings 806, 807, that are located just rearward the most frontward D-rings 804. The mentioned D-rings 806, 807 are approximately 40 cm apart, from the left side D-rings to the right side D-rings, in the example, although other spacing is also possible.

The camera mounting plate designated D-rings 806, 807 are used to secure the camera mounting plate 700. The camera mounting plate 700 is used to attach the camera gimbal 730, the camera 801 and the camera lens 810. One or more handle(s) 812 may be attached, in one example, for the purpose of carrying the float. The handle(s) may be made of seatbelt material or of a similar material. However, in other examples, the handle(s) may be omitted from the float 800.

The back end of the float 815 contains a rounded-square cut-out 826, which in the depicted example is approximately 54 cm in length and 44 cm wide, although other sizing is also possible. The opening 826 for the photographer creates two comfortable arm rest structures 830, 831 forming a U-shaped float, which in the depicted example are approximately 28 cm in width and 60 cm in length, although other sizing is also possible. The arm rest structures have the same length as the distance between the rearward D-rings 816, 817 to the middle D-rings 805 for the cover tie-points 811. The opening 826 extends from the back-end 815 of the float 800 to about an equal position of the placement of the deflation valve 825, discussed in more detail below, on the left sided arm support area 830.

In this example, there are two valves 824, 825 located on the left sided arm rest structure 830, positioned slightly rearward of the middle portion 829 of photography float 800. The valves, the inflation valve 824 and the deflation valve 825, are nearly centered directly frontward of the back D-rings 816, 817 (back position of the float 815) on the left sided arm rest structure 830. The deflation valve 825 includes a twist-top covering (shown in FIG. 8).

The U-shaped float 800 is the widest in the back 815 and in the middle portion 829. The width of the float then tapers from the back 815 toward the square shaped front-end 814 of the float 800. As true with the other two example floats 100, 400, the D-rings located in the rearward position of the arm resting structures 830, 831 are positioned more outward than the two set of D-rings 806, 807, located in the front of the float 814 and used to secure the hard-plastic plate for camera mounting 700. The entire float 800 is 120 cm in length, and the front end 814 is 38 wide, in the example, although other spacing is also possible.

The middle set of D-rings 805, located rearward of the second set of front D-rings 807 and frontward of the deflation valve 825 are used for canopy tie-down points. Additionally, another set of D-rings 817 are found in the very back region 815 of the float, which in the depicted example are used for the cover tie-down points when the float is in its compact/folded position (FIG. 10). Further, the float 800, contains one or two sets of skids (not shown) that are directly aligned with each other in a row, with the same measurements and approximate location as described in FIG. 1. However, the front and rear sets of skids are optional.

An accordion-canopy design float 400, with the attached camera equipment 801, 810 is shown in FIG. 9. The float 400 may contain a canopy mounting block 410, a camera mounting plate 700 and camera equipment 801, 810, with the associated D-rings 406, 407 used secure the plate 700. In addition, an optional D-ring 417 set for the cover tie-down points may be included. The float may have one or two sets of skids (not shown). In an example, the photographer uses the float with a rounded-front end 414 to match the arrangement of the rod 602 assembly layout.

As mentioned, for an accordion-canopy design, the rods 602 are permanently fixed to a canopy mounting block 410 that is attached to the base made of drop-stitch material 101. The advantage of the accordion-designed canopy is to allow for decreased assembly when setting up the photography float. The rods 602 are used to support the canopy 224. However, the rods 602 found in an accordion-canopy design are meant to coil to one side when folded. Folding of the rods 602 requires that the rods 602 are thin enough to coil and then the canopy 224 (not shown) can be pulled out of the bag and snapped onto the rods 602. Therefore, no assembly of rods 602 is required, which is optimal for the photographer. An accordion-canopy design float 400 is made possible by the rods 602 forming several overhead half-circle structures (hoops) when they are connected to the front (facing toward the water) face of the canopy mounting block 410. However, various types of rods or poles may be used in other examples.

The two canopy mounting blocks 410 are aligned with each other, one on the left side and one on the right side. The two canopy mounting block 410 are positioned in a row at the middle portion 429 of an accordion-canopy design float of an accordion-canopy design float 400. The canopy mounting blocks 410 are positioned toward the outer edge of the float 400, in order to provide for the maximum amount of head-room under the canopy (not shown). The canopy mounting block 410 may be made of a hard plastic or of a wood/wood-like material. Therefore, it may be advantageous to use an adhesive glue made for plastic or wood-like materials to adhere the canopy mounting blocks 410 to the outer surface of the base made of drop-stitch material 101 of the float 400.

When the rods 602 are connected to the canopy mounting blocks 410, the rods 602 can change conformation, changing from an accordion-like appearance that is used to support the material of the canopy 224 (not shown), to a coiled-like appearance that lays flat on the surface of an accordion-canopy design float 400. It is advantageous for the canopy 224 (not shown) to be detachable for the purpose of folding, traveling and storage, but it is ideal for the rods 602 to remain attached to the canopy mounting blocks 410 to avoid assembling the rods 602. Permanently attached rods are made possible by the pivot points that are found on the inside (facing toward the center of the float) or the outside (facing the water/land) of the trapezoid-shaped inset piece 500.

The positioning of the canopy 224 (not shown) is in coordination with the cutout because the block may be advantageously centered, front to back, so the canopy 224 covers as much as much of an accordion-canopy design float 400 as possible, with ample height for headspace under the canopy 224 (not shown). When in shallow waters, one may desire more head room compared to when in open water. One could use an accordion-canopy design float 400, with a cloth draped overhead, low profile respective to the water. The curvature of the rod 602 provides for an apex height 923 of 50-60 cm, in the example, although other spacing is also possible. The rods 602 are inserted into the canopy mounting blocks 410 and the natural tension of the rods 602 is used to support the canopy 224 (not shown). The canopy mounting blocks 410 are found centered with the middle portion 429 of an accordion-canopy design float 400. The canopy mounting blocks 410 are rectangular in shape when viewed from the outside of the float, with an inset piece 500, trapezoid-shaped, that connects with the rods 602. In other examples, other shapes of blocks with a matching inset can be used.

The most frontward D-rings 405 and the most rearward set of D-rings 408 are utilized for the tie-down points to secure the canopy when it is attached to the rods 602. The five sets of D-rings 405, 406, 407, 408, 417 shown in FIG. 9, are adhered to the base made of drop-stitch material 101 in the same manner as previously described, which in the depicted example is by use of a type of vinyl glue. However, other types of adhesive products could be used.

The camera mounting plate designated D-rings 406, 407 are used to secure the camera mounting plate 700 that is used to attach the camera gimbal 730, the camera 801 and the camera lens 810. The D-rings 406, 407, used to secure the camera mounting plate 700, are aligned with each other in a similar manner found in the FIG. 1, which in the depicted example is approximately 40 cm, in the example, although other sizing is also possible from the left side D-rings to the right side D-rings.

The most rearward D-rings 408, 417 are aligned with each other from the left arm rest structure 430 to the right arm rest structure 431. As previously described in the other examples, due to the U-shaped design of the float, the rearward D-rings 408, 417 are spaced a greater distance apart, which in the depicted example is approximately 58 cm apart in the example, although other spacing is also possible. The entire width of the arm rest structure 430, 431 is approximately 28 cm, in the example, although other spacing is also possible. Therefore, the placement of the rearward D-rings 408 is centered, 14 cm, at the very rearward, and on the edge position of the arm support structures 430, 431, in the example, although other spacing is also possible.

In this example, there are two valves 424, 425 located on the left side arm rest structure 430, positioned slightly rearward of the middle portion 429 of an accordion-canopy design float 400. The valves, the inflation valve 424 and the deflation valve 425, are slightly left of skids 450 (not shown). As previously mentioned, the skids have a width of 15 cm, in the example, although other spacing is also possible. As mentioned for the description in FIG. 4, an entire accordion-canopy design float 400 is 120 cm in length, and the rounded front-end 414 of an accordion-canopy design float 400 is 38 wide, in the example, although other sizing is also possible.

As mentioned, an accordion-canopy design float 400 has skids 450 (not shown) that are attached to the bottom of the float. The skids are adhered in the same way, as previously described using vinyl glue. The skids are approximately 15 cm wide, in the example, although other sizing is also possible.

The most frontward set of D-rings 405 and the most rearward set of D-rings 408, are used for canopy tie-down points. An additional set of D-rings 417 serve the purpose of the tie-down points for securing the folded position of an accordion-canopy design float 400 for traveling and/or storage purposes (folded position shown in FIG. 10).

As shown in FIG. 10, the float 100, 400, 800 can be folded into a compact position. Due to the rigid, yet flexible drop-stitch material 101, the float folds up compactly when deflated. Once the float has been deflated and folded, the camera mounting plate 700 is placed directly on-top of the folded deflated float. For a tensioned-rod-canopy design float 100, 800, the rods 102 are placed into a travel-bag 1,300. The travel-bag 1,300 containing the rods 102 is secured to the top surface of the folded float 100, 400, 800.

As mentioned, each different example float 100, 400, 800 has the option to contain additional D-rings, to provide for the cover tie-down straps. When the float is folded up, the two straps can be used to secure the entire folded float 100, 400, 800, including the camera mounting 700 in addition to the travel-bag 1,300 containing the rods 102. When the float is folded, the folded dimensions are 53 cm×35 cm×18 cm, in the example, although other sizing is also possible When folded, the travel size is approximately 21 inches long, in the example, although other sizing is also possible The float is relatively light when folded, weighing approximately 10 pounds, in the example, although other weights are also possible.

The described floats may also be used on dry land. In an example, when the photographer is hoping to capture wildlife found on a muddy-shore, the float 100, 400, 800 can also serve as a dry and level platform. Using the camera mounting plate 700, it is possible to take pictures on-land, using the gimbal mounting mechanism 730.

The floats 100, 400, 800 can be folded into a compact position, as shown in FIG. 10. The use of the deflation valve 425 enables the deflation of the drop-stitch material of the float. The canopy assembly, whether it be a tensioned-rod-style canopy design float 100, 800 or an accordion-style canopy design float 400, has very little effect on the overall size of the folded size of the float 100, 400, 800. The optional cover securing tie-down straps 1,200 can be used for all of the examples. The tie-down straps 1,200 are used to secure the folded position of the float 100, 400, 800.

Floats 100, 400, 800 may utilize the same type of camera mounting system that can accommodate different lens sizes. The camera mounting system includes a camera mounting plate 700 and a gimbal 730. The camera mounting plate 700 contains three different positions 710-712 for the gimbal attachment piece 720.

The overall U-shaped float 100, 400, 800 helps to facilitate deployment into the water and also floating out into deeper water, without carrying the float into the water. Additionally, the U-shaped design also helps the photographer easily navigate the float. Further, the U-shaped design maintains a comfortable position for the photographer. The photographer's arms comfortably rest on the arm rest structures, therefore they are not constricted.

The thinness 150 of the drop-stitch material 101 allows the photographer to remain mostly in the water to take advantage of the buoyancy that the water provides and in turn, allows for the photographer to be suspended from the bottom. The buoyancy properties provided by the float 100, 400, 800 in the water enable the photographer's hands to remain free to operate the equipment due to effort to support body weight, e.g. via elbows on the float legs. If the base is too thick, the photographer would not be able to be as immersed in the water and therefore no longer able to take advantage of the buoyancy property of the water while keeping the camera close to the surface of the water.

While in open water, free from the bottom, the float moves easily yet provides stability via the skids.

In an example, plurality of skids may be positioned on a bottom surface of the inflatable, planar, drop-stitch base, including a first pair of skids in the fore section, and a single skid on each leg. The skids 105, 117 also help the photographer while panning in the open water. In an example, a photographer may want to capture a loon leaving the water and taking flight into the sky. When the photographer is panning, focusing on a subject of interest, the skids reduce overcorrection of the position of the float.

The front of the float can be of different shapes, but in some examples has enough surface area to support the weight of the camera equipment 730, 801, 810, weighing approximately fifteen to twenty pounds.

As mentioned, the canopy may resemble something of nature that the subjects do not find threatening, such as a camouflage pattern. However, other patterns can be used to reflect the environment that the subjects occupy.

As described herein, the photography float 100, 400, 800 is designed for open water, no longer requiring the photographer to be in contact with the bottom floor of a given body of water enabling the photographer to operate in both shallow and deep waters. In contrast with the approaches described herein and where the photographer is limited to shallow water only, there is less opportunity for obtaining the desired images. If the photographer loses touch of the bottom, the photographer attempts to hold themselves up, meaning that one's hands can no longer be free to operate the camera equipment. In comparison, the disclosed photography float allows the photographer to maintain a comfortable position because the photographer's arms have a designated area on the float along with a U-shaped area for the body to rest on due to buoyancy. For this reason, the disclosed photography float can be taken out in the middle of a lake, for example, using flippers or other means of propulsion. In example, this benefit is enhanced by the common plane (for example the top surface of the float) which receives both the camera mount and enables support of the photographer's arms/elbows, thus keeping the mount low to the water while still enabling buoyancy to be imparted to the photographer.

The disclosure also provides support for a photography float, comprising: an inflatable, planar, drop-stitch base shaped with a fore section, a first aft leg, and a second aft leg, a detachable canopy arranged on a top surface of the inflatable, planar, drop-stitch base, and a camera mounting plate configured to be attached to the inflatable, planar, drop-stitch base and a gimbal to secure a camera. In a first example of the system, the detachable canopy covers substantially the entire inflatable, planar, drop-stitch base. In a second example of the system, optionally including the first example, the system further comprises: a first rod and a second rod, wherein the inflatable, planar, drop-stitch base has at least a first grommet and a second grommet in the fore section, a third grommet in the first aft leg, and a fourth grommet in the second aft leg. In a third example of the system, optionally including one or both of the first and second examples, first rod is to be positioned in the first grommet and third grommet, and the second rod is to be positioned in the second grommet and fourth grommet, wherein the first rod and second rod support the detachable canopy. In a fourth example of the system, optionally including one or more or each of the first through third examples, the canopy includes an aft zipper. In a fifth example of the system, optionally including one or more or each of the first through fourth examples, the system further comprises: a plurality of skids positioned on a bottom surface of the inflatable, planar, drop-stitch base. In a sixth example of the system, optionally including one or more or each of the first through fifth examples, the system further comprises: an accordion canopy coupled to the inflatable, planar, drop-stitch base via a first mounting block and a second mounting block. In a seventh example of the system, optionally including one or more or each of the first through sixth examples, the fore section includes a flat nose. In an eighth example of the system, optionally including one or more or each of the first through seventh examples, the first aft leg and second aft leg from a rounded cut-out. In a ninth example of the system, optionally including one or more or each of the first through eighth examples, the inflatable, planar, drop-stitch base includes a plurality of attachment points in the fore section for coupling with the camera mounting plate via one or more straps. In a tenth example of the system, optionally including one or more or each of the first through ninth examples, the camera mounting plate is generally rectangular shaped with a first side detent and a second side detent. In an eleventh example of the system, optionally including one or more or each of the first through tenth examples, the camera mounting plate includes one or more handles.

The disclosure also provides support for a photography float, comprising: an inflatable, planar, drop-stitch base shaped with a fore section having a nose, a first aft leg, and a second aft leg forming a rounded cut-out, the inflatable, planar, drop-stitch base having a top surface, the top surface including a plurality of grommets, a plurality of rods, a detachable canopy arranged on the top surface of the inflatable, planar, drop-stitch base and supported by the plurality of rods when installed in the plurality of grommets, and a camera mounting plate configured to be attached to the inflatable, planar, drop-stitch base and a gimbal to secure a camera. In a first example of the system, the system further comprises: a plurality of skids positioned on a bottom surface of the inflatable, planar, drop-stitch base. In a second example of the system, optionally including the first example, the inflatable, planar, drop-stitch base includes a plurality of attachment points in the fore section for coupling with the camera mounting plate via one or more straps that engage detents of the camera mounting plate. In a third example of the system, optionally including one or both of the first and second examples, the camera mounting plate is generally rectangular shaped, and wherein the camera mounting plate includes one or more handles.

The disclosure also provides support for a photography float, comprising: an inflatable, planar, drop-stitch base shaped with a fore section tapering toward a nose, a first aft leg, and a second aft leg forming a rounded cut-out, the inflatable, planar, drop-stitch base being symmetric about a longitudinal axis and having a top surface, the top surface including a plurality of grommets, a plurality of rods, a detachable canopy arranged on the top surface of the inflatable, planar, drop-stitch base and supported by the plurality of rods when installed in the plurality of grommets, a camera mounting plate configured to be attached to the inflatable, planar, drop-stitch base and a gimbal to secure a camera, and a plurality of skids positioned on a bottom surface of the inflatable, planar, drop-stitch base, including a first pair of skids in the fore section, and a single skid on each leg. In a first example of the system, the detachable canopy includes a plurality of viewing windows. In a second example of the system, optionally including the first example, a plurality of straps couple the detachable canopy to the first aft leg and the second aft leg. In a third example of the system, optionally including one or both of the first and second examples, the rounded cut-out is laterally wider than the first aft leg.

FIGS. 1-10 show example configurations with relative positioning of the various components, and are drawn to scale, although other relative sizing may be used. Unless otherwise noted, if shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a “top” of the component and a bottommost element or point of the element may be referred to as a “bottom” of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to “an” element or “a first” element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A photography float, comprising:

an inflatable, planar, drop-stitch base shaped with a fore section, a first aft leg, and a second aft leg;

a detachable canopy arranged on a top surface of the inflatable, planar, drop-stitch base; and a camera mounting plate configured to be attached to the inflatable, planar, drop-stitch base and a gimbal to secure a camera, wherein the inflatable, planar, drop-stitch base includes a plurality of attachment points in the fore section for coupling with the camera mounting plate via one or more straps.

2. The photography float of claim 1 wherein the detachable canopy covers substantially an entirety of the inflatable, planar, drop-stitch base.

3. The photography float of claim 2 further comprising a first rod and a second rod, wherein the inflatable, planar, drop-stitch base has at least a first grommet and a second grommet in the fore section, a third grommet in the first aft leg, and a fourth grommet in the second aft leg.

4. The photography float of claim 3 wherein first rod is to be positioned in the first grommet and third grommet, and the second rod is to be positioned in the second grommet and fourth grommet, wherein the first rod and second rod support the detachable canopy.

5. The photography float of claim 4 wherein the detachable canopy includes an aft zipper.

6. The photography float of claim 1 wherein the fore section includes a flat nose.

7. The photography float of claim 1 wherein the first aft leg and second aft leg from a rounded cut-out.

8. A photography float, comprising:

an inflatable, planar, drop-stitch base shaped with a fore section, a first aft leg, and a second aft leg;

a detachable canopy arranged on a top surface of the inflatable, planar, drop-stitch base;

a camera mounting plate configured to be attached to the inflatable, planar, drop-stitch base and a gimbal to secure a camera; and a plurality of skids positioned on a bottom surface of the inflatable, planar, drop-stitch base.

9. A photography float, comprising:

an inflatable, planar, drop-stitch base shaped with a fore section, a first aft leg, and a second aft leg;

a detachable canopy arranged on a top surface of the inflatable, planar, drop-stitch base;

a camera mounting plate configured to be attached to the inflatable, planar, drop-stitch base and a gimbal to secure a camera; and an accordion canopy coupled to the inflatable, planar, drop-stitch base via a first mounting block and a second mounting block.

10. A photography float, comprising:

an inflatable, planar, drop-stitch base shaped with a fore section, a first aft leg, and a second aft leg;

a detachable canopy arranged on a top surface of the inflatable, planar, drop-stitch base; and a camera mounting plate configured to be attached to the inflatable, planar, drop-stitch base and a gimbal to secure a camera, wherein the camera mounting plate is generally rectangular shaped with a first side detent and a second side detent.

11. The photography float of claim 10 wherein the camera mounting plate includes one or more handles.

12. A photography float, comprising:

an inflatable, planar, drop-stitch base shaped with a fore section having a nose, a first aft leg, and a second aft leg forming a rounded cut-out, the inflatable, planar, drop-stitch base having a top surface, the top surface including a plurality of grommets;

a plurality of rods;

a detachable canopy arranged on the top surface of the inflatable, planar, drop-stitch base and supported by the plurality of rods when installed in the plurality of grommets; and a camera mounting plate configured to be attached to the inflatable, planar, drop-stitch base and a gimbal to secure a camera.

13. The photography float of claim 12 further comprising a plurality of skids positioned on a bottom surface of the inflatable, planar, drop-stitch base.

14. The photography float of claim 13 wherein the inflatable, planar, drop-stitch base includes a plurality of attachment points in the fore section for coupling with the camera mounting plate via one or more straps that engage detents of the camera mounting plate.

15. The photography float of claim 14 wherein the camera mounting plate is generally rectangular shaped, and wherein the camera mounting plate includes one or more handles.

16. A photography float, comprising:

an inflatable, planar, drop-stitch base shaped with a fore section tapering toward a nose, a first aft leg, and a second aft leg forming a rounded cut-out, the inflatable, planar, drop-stitch base being symmetric about a longitudinal axis and having a top surface, the top surface including a plurality of grommets;

a plurality of rods;

a detachable canopy arranged on the top surface of the inflatable, planar, drop-stitch base and supported by the plurality of rods when installed in the plurality of grommets;

a camera mounting plate configured to be attached to the inflatable, planar, drop-stitch base and a gimbal to secure a camera; and a plurality of skids positioned on a bottom surface of the inflatable, planar, drop-stitch base, including a first pair of skids in the fore section, and a single skid on each leg.

17. The photography float of claim 16 wherein the detachable canopy includes a plurality of viewing windows.

18. The photography float of claim 16 wherein a plurality of straps couple the detachable canopy to the first aft leg and the second aft leg.

19. The photography float of claim 16 wherein the rounded cut-out is laterally wider than the first aft leg.

* * * * *